(12) United States Patent
Byun et al.

(10) Patent No.: US 11,344,149 B2
(45) Date of Patent: May 31, 2022

(54) BEVERAGE MACHINE WITH ERGONOMIC POWER SWITCH

(71) Applicant: SOCIETE DES PRODUITS NESTLE S.A., Vevey (CH)

(72) Inventors: Da Mi Byun, Lausanne (CH); Bertrand Guyon, Pontarlier (FR); Marco Magatti, Lausanne (CH); Eric Meyer, Pully (CH); Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 245 days.

(21) Appl. No.: 16/617,686

(22) PCT Filed: May 30, 2018

(86) PCT No.: PCT/EP2018/064145
§ 371 (c)(1),
(2) Date: Nov. 27, 2019

(87) PCT Pub. No.: WO2018/219988
PCT Pub. Date: Dec. 6, 2018

(65) Prior Publication Data
US 2020/0100617 A1 Apr. 2, 2020

(30) Foreign Application Priority Data

Jun. 1, 2017 (EP) ..................... 17173877

(51) Int. Cl.
*A47J 31/44* (2006.01)
*A47J 31/46* (2006.01)

(52) U.S. Cl.
CPC ........... *A47J 31/4403* (2013.01); *A47J 31/46* (2013.01)

(58) Field of Classification Search
CPC ........ A47J 31/44; A47J 31/4403; A47J 31/46; A47J 31/58
See application file for complete search history.

(56) References Cited

U.S. PATENT DOCUMENTS

| 8,383,180 B2 | 2/2013 | Vastardis |
| 10,307,010 B2 | 6/2019 | Fontbonne |
| (Continued) |

FOREIGN PATENT DOCUMENTS

| AU | 2003244814 A1 | 1/2004 |
| CH | 276991 | 11/1951 |
| (Continued) |

OTHER PUBLICATIONS

China Patent Office Communication for Application No. 20188034451.3, dated Oct. 19, 2021, 23 pages.

*Primary Examiner* — John J Norton
(74) *Attorney, Agent, or Firm* — K&L Gates LLP

(57) ABSTRACT

A machine (1) for preparing and dispensing a beverage includes a beverage preparation and dispensing unit that has: an ingredient container (46, 50, 50a); a dispensing head (35) with a beverage outlet (36) for dispensing the beverage to a beverage dispensing surface (5, 37); and a liquid circuit for processing the beverage and delivering such beverage into the beverage outlet (36). The liquid circuit has at least one activatable unit (40, 51, 52) that is passed through by liquid during beverage preparation. The machine further includes: a power unit (54') connected to a main switch (54) and to the activatable unit(s) (40, 51, 52); and a functional part that is configured to perform a function other than actuating the main switch (54) and that has a beverage preparing and dispensing position and that is movable into a different position in which no beverage is intended to be prepared or dispensed. The functional part (40, 35) is further configured to operate, when moved to the dispensing position or to the (Continued)

different position, the main switch (54) so as to enable or disable the supply of power from the power unit (54') to the activatable unit(s) (40, 51, 52).

15 Claims, 5 Drawing Sheets

(56) References Cited

U.S. PATENT DOCUMENTS

| | | | |
|---|---|---|---|
| 10,470,606 B2 | 11/2019 | Yoakim et al. | |
| 10,820,740 B2 | 11/2020 | Morend et al. | |
| 2003/0051603 A1 | 3/2003 | Yoakim et al. | |
| 2007/0261565 A1* | 11/2007 | Reyhanloo | A47J 31/545 99/280 |
| 2010/0089244 A1* | 4/2010 | Zwahlen | A47J 31/525 99/275 |
| 2015/0018986 A1 | 1/2015 | Weiss et al. | |
| 2016/0346743 A1 | 12/2016 | Snider et al. | |
| 2017/0217749 A1* | 8/2017 | Calderone | B67D 1/0878 |
| 2019/0059639 A1 | 2/2019 | Branko et al. | |

FOREIGN PATENT DOCUMENTS

| | | | |
|---|---|---|---|
| CN | 201219827 Y | 4/2009 | |
| CN | 101779921 A | 7/2010 | |
| CN | 202341786 U | 7/2012 | |
| CN | 204839166 U | 12/2015 | |
| CN | 204926699 U | 12/2015 | |
| CN | 204995231 U | 1/2016 | |
| CN | 106108655 A | 11/2016 | |
| CN | 108151293 A | 6/2018 | |
| DE | 102010007376 A1 * | 7/2010 | A47J 31/4407 |
| DE | 102012200322 | 7/2013 | |
| EP | 1707088 | 10/2006 | |
| EP | 2070454 A1 | 6/2009 | |
| EP | 3199486 A1 | 8/2017 | |
| KR | 20160148777 A | 12/2016 | |
| WO | 2015193489 A1 | 12/2015 | |
| WO | 2017036361 | 3/2017 | |

* cited by examiner

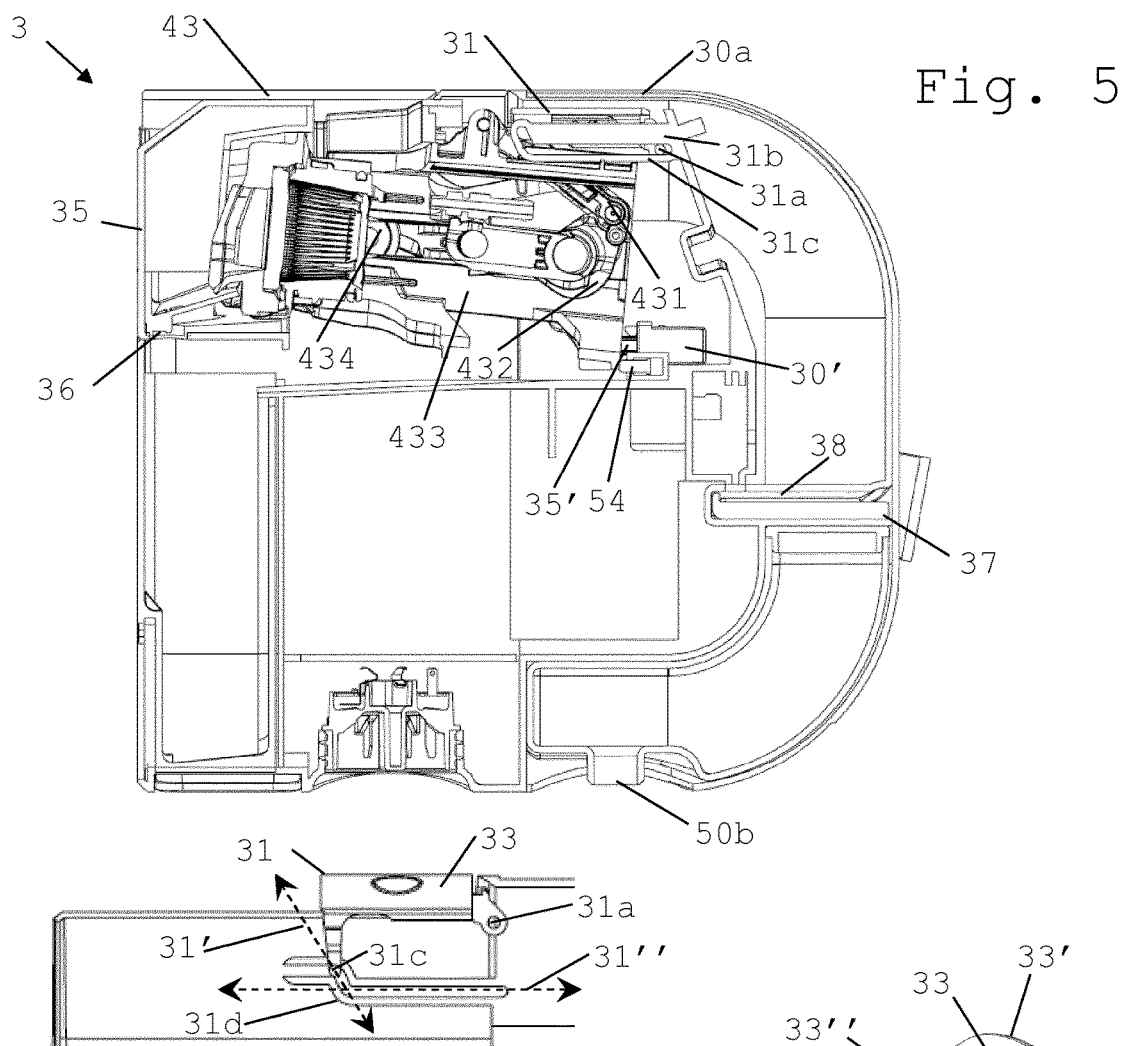
Fig. 5
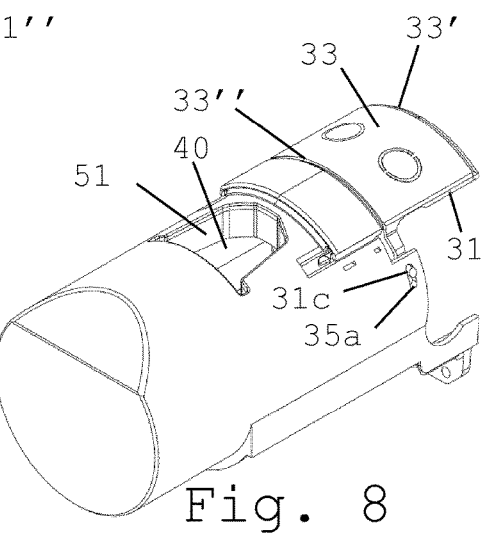
Fig. 8
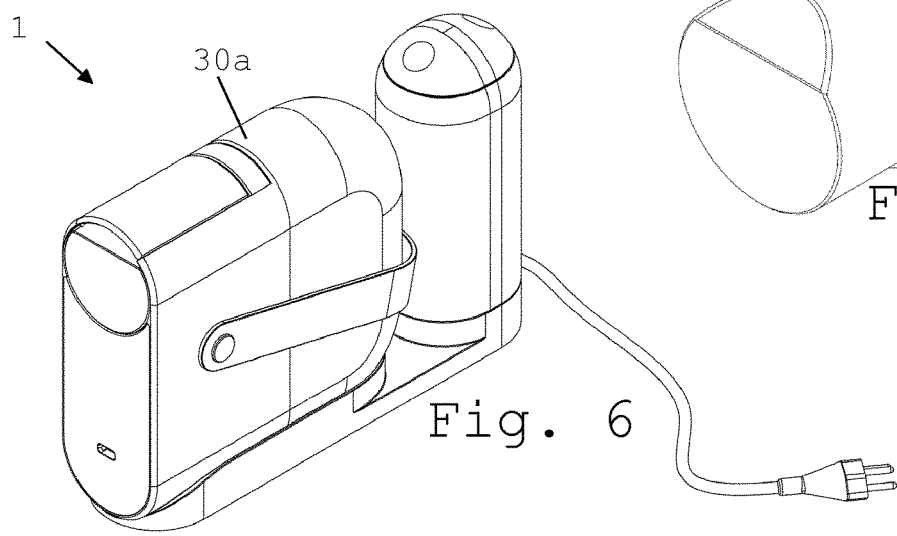
Fig. 7
Fig. 6

BEVERAGE MACHINE WITH ERGONOMIC POWER SWITCH

CROSS REFERENCE TO RELATED APPLICATIONS

The present application is a National Stage of International Application No. PCT/EP2018/064145, filed on May 30, 2018, which claims priority to European Patent Application No. 17173877.6, filed on Jun. 1, 2017, the entire contents of which are being incorporated herein by reference

FIELD OF THE INVENTION

The field of the invention pertains to beverage preparation machines provided with an ergonomic power switch, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

It is also known to make portable machines for preparing beverage, for instance as disclosed in U.S. Pat. No. 6,739, 241, WO 99/02081, WO 2006/102980, US 2007/0199452, WO 2009/092746, EP 1 686 879 and WO 2011/131595.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule. The actuation of the movable part of the brewing device may be manual as disclosed in WO 2009/ 043630, WO 01/15581, WO 02/43541, WO 2010/015427, WO 2010/128109, WO 2011/144719 and WO 2012/032019. Various handle configurations are disclosed in EP 1867260, WO 2005/004683, WO WO2007/135136, WO 2008/ 138710, WO 2009/074550, WO 2009/074553, WO 2009/ 074555, WO 2009/074557, WO 2009/074559, WO 2010/ 037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067.

The actuation of the movable part of the brewing device may be motorized. Such a system is for example disclosed in WO 2012/025258, WO 2012/025259, WO 2013/127476 and EP 1 767 129. In this latter disclosure, the brewing device has a capsule insertion passage provided with a safety door assembled to the movable part of the brewing device via a switch for detecting an undesired presence of a finger in the passage during closure. Alternative covers for a capsule insertion passage are disclosed WO 2012/093107 and WO 2013/127906.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO99/50172, WO 2004/030435, WO 2004/ 030438, WO 2006/063645, WO 2006/090183, WO 2007/ 003062, WO 2007/003990, WO 2008/104751, WO 2008/ 138710, WO 2008/138820, WO 2010/003932, WO 2011/ 144720 and WO 2012/032019.

WO 2007/141334 and WO 2008/006682 disclose a beverage dispensing machine with a beverage preparation module that is movable relative to a base station.

WO 2006/050881 discloses a milk frother that has a dispensing head for dispensing the frother milk. The dispensing head is retractable inside the forther's housing for the time needed at the end of a dispensing cycle to perform a cleaning cycle of the dispensing head. WO 2009/043630 and PCT/EP16/070680 disclose a beverage machine with a dispensing head that is movable into and out of the machine's external casing. PCT/EP16/070685 discloses a beverage machine with a user-interface that is movable into and out of the machine's external casing.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, caf latte, americano coffees, teas, etc. . . . . For instance, a coffee machine may be configured for dispensing espressos, e.g. an adjustable volume of 20 to 60 ml per portion, and/or for dispensing lungos, e.g. a volume in the range of 70 to 150 ml per portion.

The machine of the invention includes a beverage preparation and dispensing unit that has: an ingredient container, such as a container for supplying a beverage ingredient and/or a container for collecting waste ingredient; a dispensing head comprising a beverage outlet for dispensing the beverage to a beverage dispensing surface arranged for supporting a user-mug or a user-cup; a liquid circuit for processing the beverage and delivering such beverage into the beverage outlet, the liquid circuit comprising at least one activatable unit that is passed through by liquid during beverage preparation.

Examples of suitable waste ingredient collectors for carrying out the present invention are disclosed in EP 1867260, WO 2009/074559, WO 2009/135869, WO 2010/128109, WO 2011/086087 and WO 2011/086088.

The activatable unit may be selected from: a liquid driver such as an electric pump e.g. a solenoid pump, a rotary pump, a diaphragm pump, a positive displacement pump or a peristaltic pump, for driving liquid to the outlet; a thermal conditioner, such as a liquid heater and/or cooler, for thermally conditioning liquid delivered by the outlet; and an ingredient processing unit, such as a unit mounted in or comprised in of fixed to the dispensing head.

The thermal conditioner may be a boiler or a thermoblock or an on demand heater (ODH), for instance an ODH type disclosed in EP 1 253 844, EP 1 380 243 and EP 1 809 151.

Examples of liquid drivers e.g. pumps and their incorporation into beverage machines are disclosed in WO 2009/150030, WO 2010/108700, WO 2011/107574 and WO 2013/098173.

Typically, the liquid circuit comprises one or more liquid ducts for guiding liquid from a liquid supply arrangement to the outlet.

The machine incorporates a power unit connected to a main switch and to the at least one activatable unit. The supply of power from the power unit to such at least one activatable unit is interrupted by actuating the main switch. Optionally, the power unit is connected to a control unit with a user-interface device.

The machine has a functional part that is configured to perform a function other than actuating the main switch and that has a beverage preparing and dispensing position and that is movable into a different position in which no beverage is intended to be prepared or dispensed. The functional part may be selected from: the ingredient container; the dispensing head; the at least one activatable unit; or a carrying handle.

The functional part is further configured to operate, when moved to the dispensing position or to the different position, the main switch so as to enable or disable the supply of power from the power unit to at least one activatable unit.

It follows that the machine's main switch can be automatically operated when the functional part is brought into a configuration for preparing and dispensing beverage and/or into a configuration that is not intended for preparing and dispensing beverage, such as a configuration in which no beverage can be prepared and/or dispensed. Hence, no separate operation is required by the user to operate the power switch operated by the functional part and/or the risk is avoided that the machine could be operated to prepare and/or dispense beverage in an inappropriate configuration resulting from the position of the functional part.

The machine may further have an outside housing with one or more outside faces, such as one or more faces selected from a top face, a side face, a rear face and a front face. The functional part can be movable outwards out of the outside housing into a deployed operative position and inwards into the outside housing into a retracted storage position.

Hence, the functional part, e.g. a or the above user-interface device or the dispensing head, can be configured to be retracted when it does not need to be accessible and can be deployed when used, in a flexible manner. The orientation of the functional part can be changed between the deployed and retracted positions and/or the functional part in the deployed position can be off-set vis-à-vis its position in the retracted position. It follows that the movement and orientation of the functional part can be adapted to the overall configuration of the machine so as to best fit ergonomic and/or dimensional objectives.

The functional part may be or include the dispensing head. In the deployed operative position a beverage may be dispensible via the outlet to the beverage dispensing surface.

In the retracted storage position, the outlet may be confined within the outside housing and/or the dispensing head may be surrounded by outside faces of the outside housing that are generally flush with apparent faces of the dispensing head.

The dispensing head can be guided from its deployed operative position into its retracted storage position and vice versa by a cam-follower and cam arrangement.

The dispensing head may be configured so that it can be maintained in: the deployed operative position whether the activatable unit(s) is/are activated or maintained activated or deactivated or maintained deactivated; and/or the retracted storage position whether the activatable unit(s) is/are activated or maintained activated or deactivated or maintained deactivated.

The dispensing head may be configured so as to be movable: manually by a user from the deployed operative position to the retracted storage position and/or vice versa; and/or automatically, e.g. by a motor and/or an automatic return-spring, from the deployed operative position to the retracted storage position and vice versa. The dispensing head can be moved: into its deployed operative position when such machine is powered; and/or into its retracted storage position when a powering of such machine is interrupted.

The dispensing head may be configured so as to be maintained in its deployed operative position and/or in its retracted storage position by at least one of: a friction and/or magnetic force, clipping arrangement and locking arrangement.

The functional part may be or incorporate a or the above user-interface device movable from:
  the deployed operative position that is adjacent to a face of the one or more outside faces of the outside housing so that the device is accessible by a user for controlling the beverage preparation and dispensing unit to prepare and dispense the beverage; to
  the retracted storage position in the outside housing so that the device is inaccessible to a user for operating such machine;
  and/or vice versa.

The user-interface device can be guided from its deployed operative position into its retracted storage position and vice versa by a cam-follower and cam arrangement. Optionally the cam of the arrangement has a first section extending along the first direction and a second section extending along the second direction. For instance, the user-interface device is associated with a pair of cams having different, sequentially off-set, profiles such that when the user-interface device is moved from the operative to the storage positions it has a front edge that is lowered and displaced underneath the outside housing while a rear edge of the device, uncovered by the outside housing, remains above the front edge during a part of a movement of the user-interface device between the operative and the storage positions.

The user-interface device may bear one or more interface elements, e.g. touch elements, such as button(s) or a touch pad or a touch screen, and/or one or more user indicators, such as light means e.g. LED or signal screen, which interface element(s) relate to operations of the or a machine's control unit other than activities of the power unit.

The user-interface device can have in its deployed operative position a main outside face that is generally flush with the housing outside face that is adjacent to the user-interface device. Optionally the device's main outside face in the deployed operative position is predominantly surrounded, e.g. entirely surrounded, by housing outside faces that are flush with the device's main outside face.

The user-interface device may be coupled to the dispensing head so as to be driven by the head or vice versa between the deployed operative and the retracted storage positions. For instance, the dispensing head and the user-interface device are coupled together by a rigid or an articulated arrangement, such as a cam-follower and cam arrangement or a flexible mechanically connector or by a lever arrangement.

The user-interface device may be movable, e.g. manually and/or automatically, from its deployed operative position into its retracted storage position and vice versa along a first direction and a second direction that is non-parallel to the first direction.

The first direction may follow a movement of the user-interface device generally sinking into and emerging from the outside housing, optionally the first direction being generally orthogonal to the housing outside face that is adjacent to the device in its operative position or at an angle to the outside face that is in the range of 45 to 90 deg., such as 60 to 90 deg., e.g. 75 to 90 deg. The second direction can follow a movement of the user-interface device hiding behind and along the housing outside face that is adjacent to the user-interface device in its deployed operative position, optionally the second direction being generally parallel to the outside face that is adjacent to the device in its operative position or at an angle to this face that is in the range of 0 to 45 deg., such as 0 to 30 deg., e.g. 0 to 15 deg.

The first direction may be at a large angle relative to a main outside face of the user-interface device in its deployed operative position, for instance a large angle in the range of 45 to 90 deg., such as a large angle of at least 60 deg., e.g. a large angle of at least or 75 or 85 deg. The second direction can be at a small angle relative to a main outside face of the user-interface device in its deployed operative position, for instance a small angle in the range of 0 to 45 deg., such as a small angle of less than 30 deg., e.g. a small angle of at less than 15 or 5 deg.

The power unit may have a connector to an external power supply, such as an electric cord and/or plug connectable to the mains, and an internal power accumulator, such as a rechargeable battery, for powering to prepare and dispense said beverage when such machine is not powered via this connector. For instance, the accumulator is charged via the connector when connected to an external power supply.

In an embodiment, the machine includes a docking station and a module disconnectably connected to the docking station, the docking station and the module comprising at least one of: a station ingredient supply such as a water tank and a module liquid connector connectable to the station ingredient supply; and a station connector to an external power supply, such as a station electric cord and/or plug connectable to the mains, and a module connector, e.g. a rigid connector stationary in the module, connectable to the station connector, e.g. a rigid connector stationary in the station. The module may include an arrangement for preparing and dispensing the beverage.

The module may incorporate the beverage preparation and dispensing unit and a main reservoir fluidically disconnectably connectable by a liquid connector to the docking station, e.g. to a main reservoir and/or to a liquid supply line of the docking station.

The module can have at least one of: a or the above internal power supply, such as a rechargeable battery; a or the above connector to an external power supply, such as a module electric cord and/or plug connectable to the mains; a or the above control unit for controlling the module and optionally functions contained in the docking station; and a or the above user-interface device that is optionally connected, when present, to the control unit.

The machine may include one or more movable placement members for placing such machine, such as a or the above module of the machine, onto a generally flat external support surface in an orientation for preparing the beverage in the liquid circuit and delivering such beverage via the beverage outlet to the beverage dispensing surface.

The movable placement member(s) can have a deployed placement position for increasing a stability and/or safely placing such machine, e.g. such module, on the external support surface in an orientation for preparing and dispensing said beverage. For instance, the placement member(s) in the deployed placement position extends away from the outside housing and/or extends laterally beyond at least one of the side face, rear face and front face.

The movable placement member(s) may have a retracted rest position within the outside housing or collapsed against the outside housing, e.g. collapsed against and extending along the outside housing, for: reducing a size of such machine, e.g. such module, to displace it; and/or providing a configuration suitable for placing such module onto a or the above docking station of such machine and connecting the module to the docking station.

The placement member(s) can be pivotably and/or translationally mounted relative to the outside housing, for moving the placement member(s) from the deployed placement position to the retracted rest position and vice versa.

An incorporation of the placement member(s) in such machine may thus provide an overall size reduction when in the retracted rest position (e.g. for storing or displacing the machine) and/or provide a configuration suitable for placing a separable module (fitted with the placement member(s)) of the machine onto a docking station of such machine and connecting the module to the docking station, the module being placeable in the beverage preparation and dispensing orientation with the aid of the placement member(s) on an external support surface when not docked onto the docking station.

In the orientation for preparing the beverage in the liquid circuit and delivering such beverage via the beverage outlet to the beverage dispensing surface:

the or at least one placement member in the deployed placement position may extend laterally beyond a housing outside face that extends upright above the placement member such as beyond the housing outside face by a horizontal distance of at least 3 mm such as in the range of 5 to 25 mm, e.g. 10 to 15 mm; and/or such machine has:
an overall height extending from a bottom end of the deployed placement member to a top end of such machine; and
an overall distance spacing a housing outside face extending upright above the placement member and a housing outside face facing the previous housing outside face, such that a ratio of the overall height/overall distance is of at least 1.3, such as at least 1.5, for instance at least 2, for example at 2.5, e.g. at least 3; and/or the outside housing has a bottom outside face adjacent to the or at least one placement member, the bottom outside face having a generally convex, biconvex, multi-convex or downwardly tapered shape, such as a generally rounded shape, e.g. cylindrical, spherical, ellipsoidal, ovoidal or conical shape, and/or such as generally polyhedral shape, e.g. prismatic or pyramidal shape.

The machine may have one or more stationary placement members for placing such machine, such as a or the above module of such machine, onto a generally flat external support surface. For instance, the machine has a stationary placement member protruding upright underneath such machine in an orientation for preparing and dispensing the beverage.

The ingredient processing unit can have an ingredient holder forming an ingredient seat, e.g. a seat in which ingredients are mixed in a mixing unit.

Optionally, the ingredient processing unit has a first module and a second module that are movable relatively to each other by an actuator between: a distant configuration for inserting into the seat and/or removing from the seat, e.g. towards a waste ingredient collector, an ingredient, e.g. a flavouring ingredient supplied within a capsule into the seat for instance via an ingredient supply channel; and a proximate configuration for processing the ingredient in the seat.

Examples of suitable mixing unit with first and second modules that are relatively moved by a motor are disclosed in EP 1767129, WO 2012/025258, WO 2012/025259, WO 2013/127476 and WO 2014/056641. The first module and the second module of the mixing unit can be relatively movable generally along a longitudinal straight axis. Typically, the first and second modules of the mixing module are distant from each other in the transfer position and close to each other in the mixing position. In the mixing position, the first and second modules may define a mixing chamber, e.g. a chamber for receiving a plurality of beverage ingredients to be mixed together. In one embodiment, the mixing chamber is an infusion chamber in which infusible ingredients, e.g. coffee or tea, are exposed to a carrier liquid, such as water e.g. hot water. The mixing chamber may be configured to receive loose solid ingredient particles and/or to receive proportioned ingredients within a capsule. At least one part of the first and second modules may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis. The other part of these first and second parts may include an extraction plate, such as a plate provided with piercing elements for opening a flow-through face of the capsule or a non-intrusive plate for cooperating with a pre-opened or a self-opening flow-through face of the capsule. Self-opening capsules are for instance disclosed in CH 605 293 and WO 03/059778. The opening of capsules by a machine's piercing elements of a plate are for example disclosed in EP 512 470 and EP 068 684. Examples of suitable mixing modules with mixing chambers are disclosed in WO 2008/037642 and WO 2013/026843. A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second modules of the mixing units. When closed capsules are used, the first and second modules may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein. The interaction between the first and second modules (and optionally a capsule transfer channel) and an ingredient capsule may be of the type disclosed in WO 2005/004683, WO 2007/135135, WO2007/135136, WO 2008/037642 and WO 2013/026856. The machine may include a capsule loader associated with the transfer channel for loading a capsule. The capsule to be loaded may be of the type described above under the title "Field of the Invention" and/or the capsule may include an ingredient described under the same title. The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food. The capsule loader may have: a capsule holding configuration for holding an ingredient capsule away from the mixing unit; and a capsule releasing configuration for releasing the capsule in or into the transfer channel towards the mixing unit. The loader may have a capsule gate that is movable, such as pivotable and/or translatable, between a position obstructing the transfer channel for preventing a passage of the capsule along the channel and a position clearing the transfer channel for allowing a passage of the capsule along the channel. Details of suitable capsule loaders are disclosed in WO 2012/126971, WO 2014/056641, WO 2014/056642 and WO 2015/086371. Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

The actuator may include at least one of: an automatic actuator, e.g. a motor such as an electric motor; a semi-automatic actuator, e.g. a return-spring arrangement for automatically returning the first and second modules either into their distant configuration or into their proximate configuration; and a user-handle, such as a handle that is connected to at least one of the first and second modules and that actuates said at least one of the modules by moving the handle from a first position to a second position. For example, the handle in at least one of its first and second positions is flush with at least one of a or said outside housing and a or the above user-interface device.

The actuator can be connected to at least one of the first and second modules by a transmission that comprises at least one of a belt transmission, a gear transmission, e.g. a toothed gear transmission, and a lever transmission.

The dispensing surface may be formed by an external placement support for placing such machine in position for preparing and dispensing said beverage.

The dispensing surface can be formed by a user-recipient support device of such machine. For instance, the user-recipient support device is removable from under the outlet, such as separable from a module of such machine and storable in a storage seat of such module, e.g. storable in the storage seat and secured therein by at least one of: friction and/or magnetic force between the seat and the support device; clipping or locking the support device in the seat; and covering the seat by at least one of a door, gate, housing cover e.g. a cocoon-type half shell, carrying handle and belt.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198712, EP 2014198710 and EP 2014198715.

BRIEF DESCRIPTION OF THE DRAWINGS

The invention will now be described with reference to the schematic drawings, wherein:

FIG. 5 is a cross-sectional view of a module of the machine shown in FIG. 1 or 2 in a compacted configuration;

FIG. 6 is a perspective view of the machine shown in FIG. 1 in a compacted configuration;

FIGS. 7 and 8 illustrate the assembly of a user-interface device in the machine shown in any of FIGS. 1 to 6;

DETAILED DESCRIPTION

Figure 1:
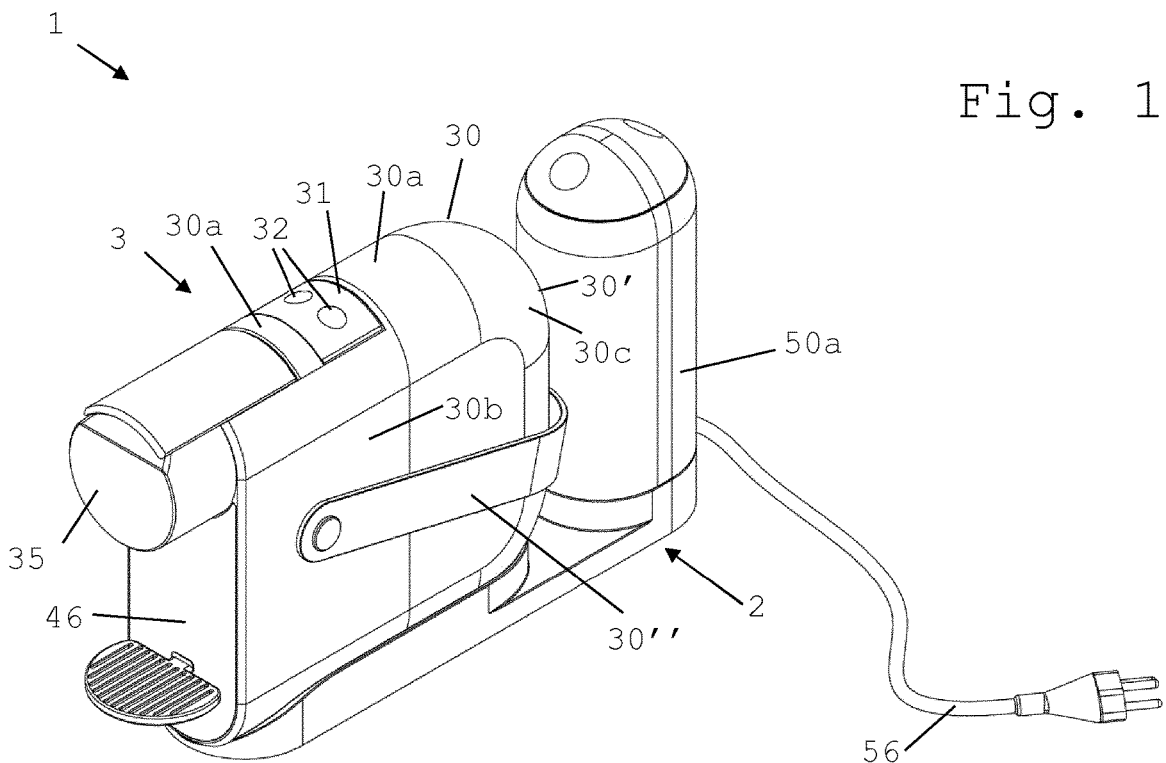
FIG. 1 is a perspective view of a machine in accordance with the invention.
Figure 2:
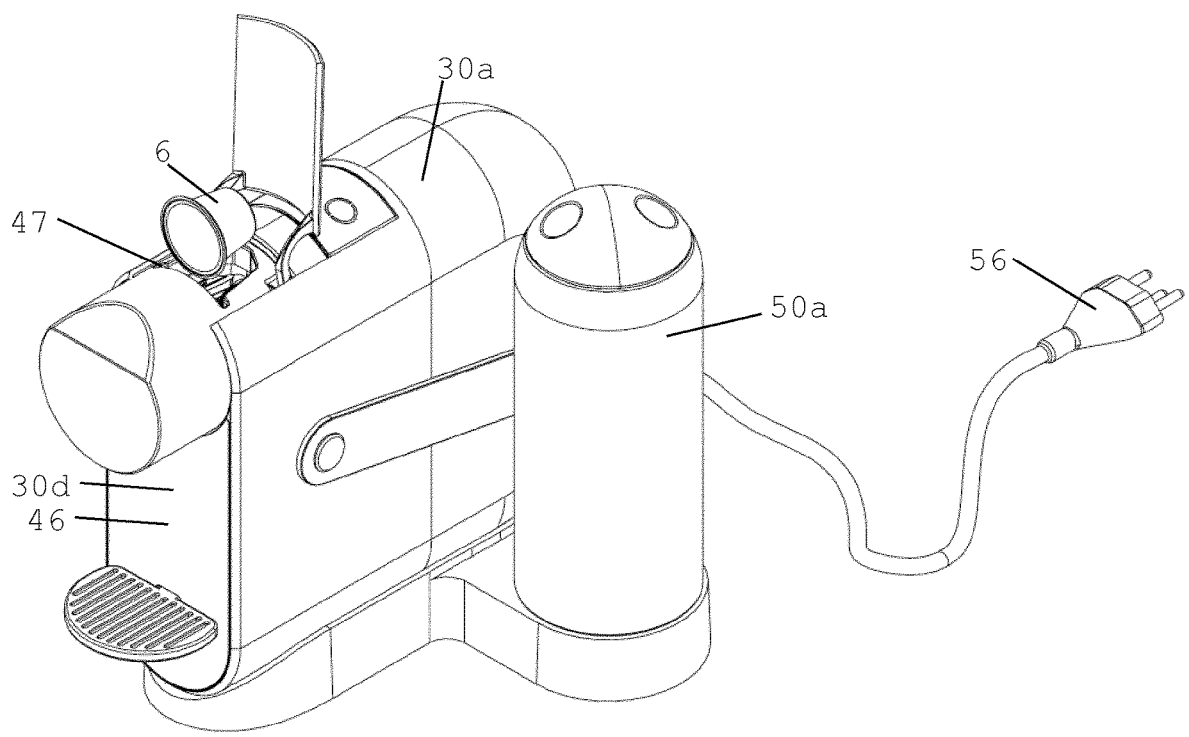
FIG. 2 is a perspective view of a variation of the machine of FIG. 1 in a configuration for receiving an ingredient capsule.
Figure 3:
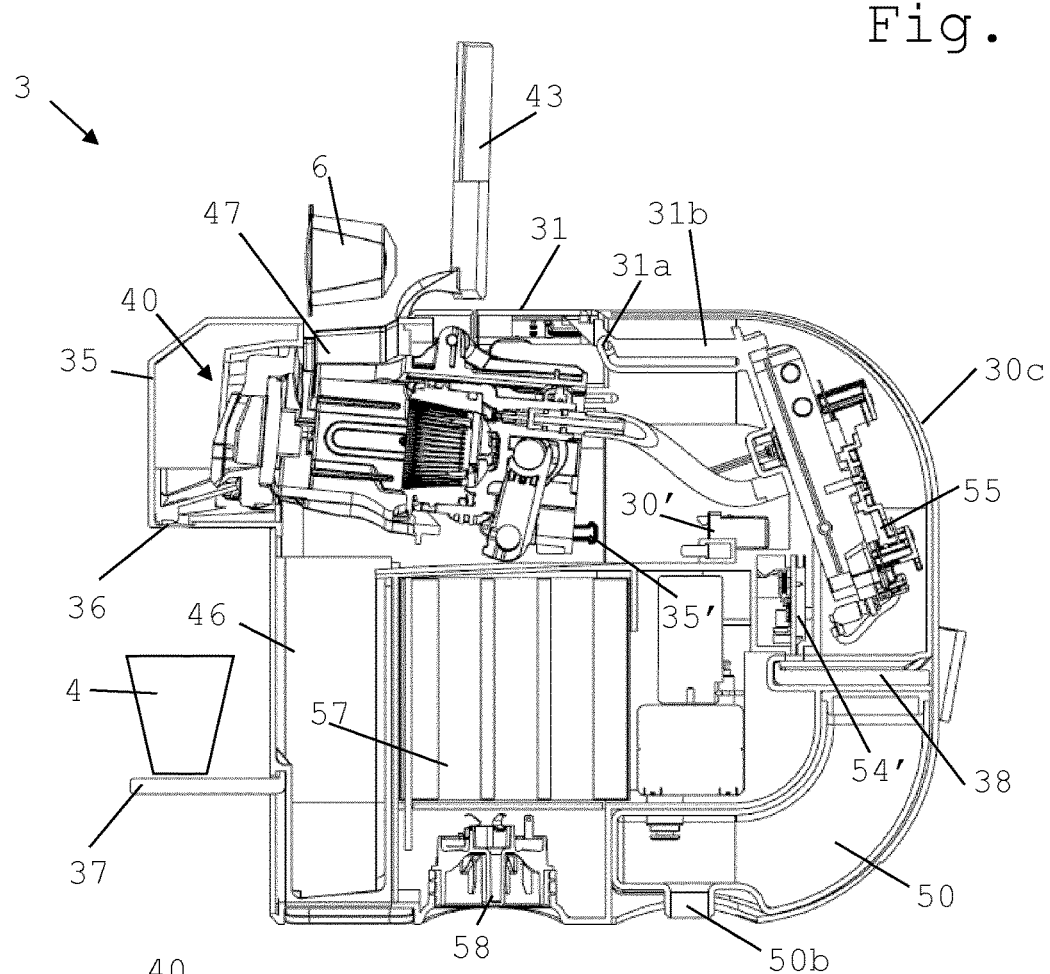
FIG. 3 is a cross-sectional view of a module of the machine of FIG. 1 or 2 in a configuration for receiving an ingredient capsule.
Figure 4:
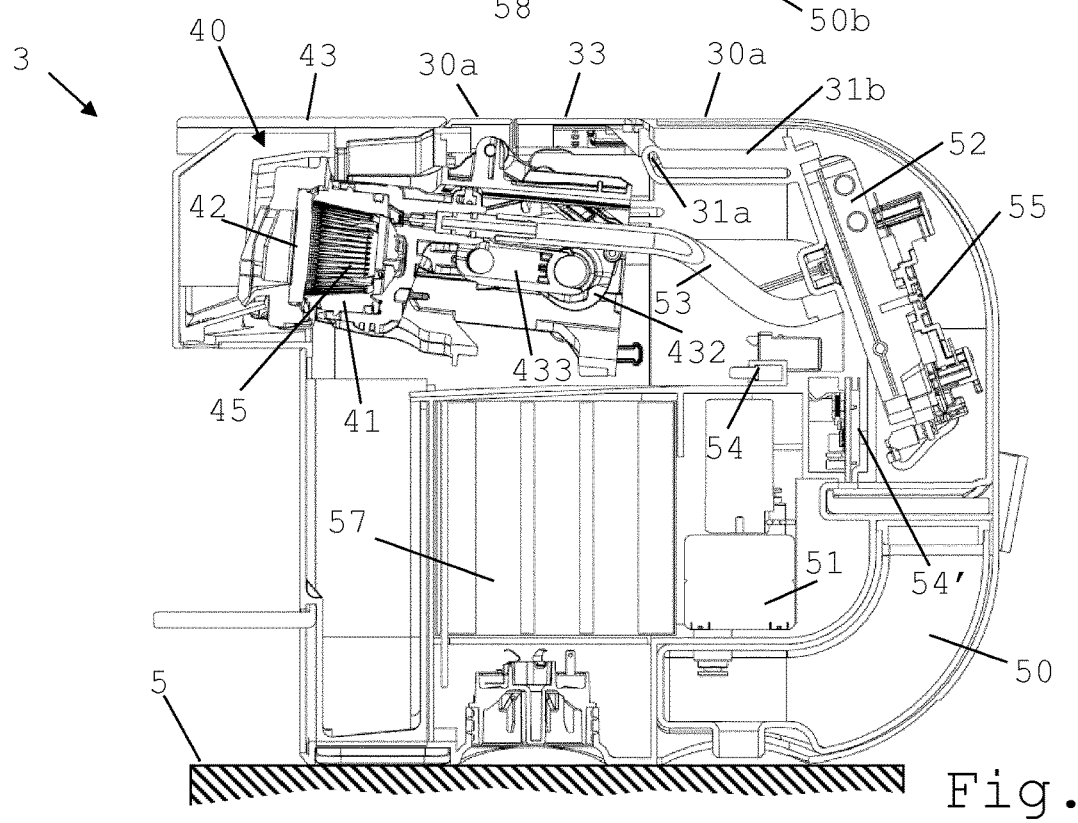
FIG. 4 is a cross-sectional view of a module of the machine shown in FIG. 1 or 2 in a closed configuration.
Figure 9:
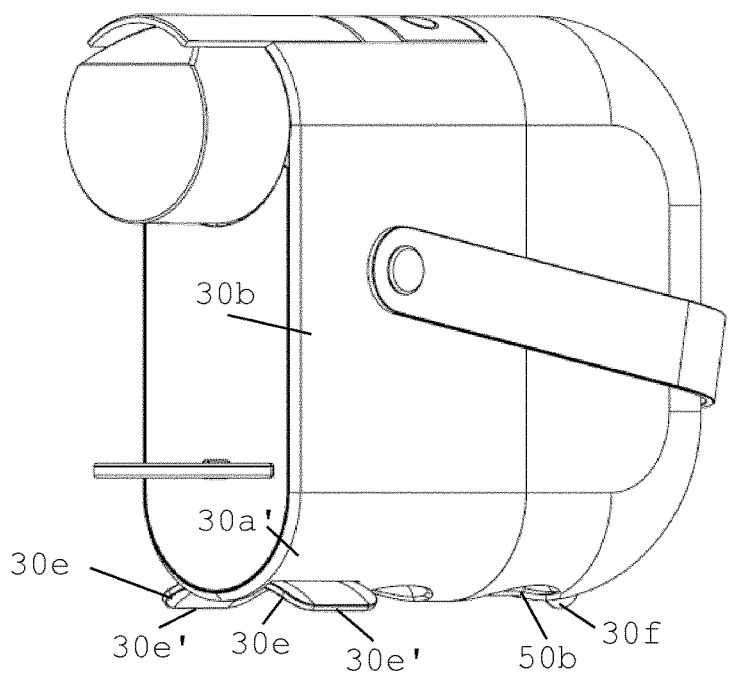
FIG. 9 is a perspective view of a module of the machine shown in any of FIGS. 1 to 8, the module having deployed placement members for placing the module on a support surface.
Figure 11:
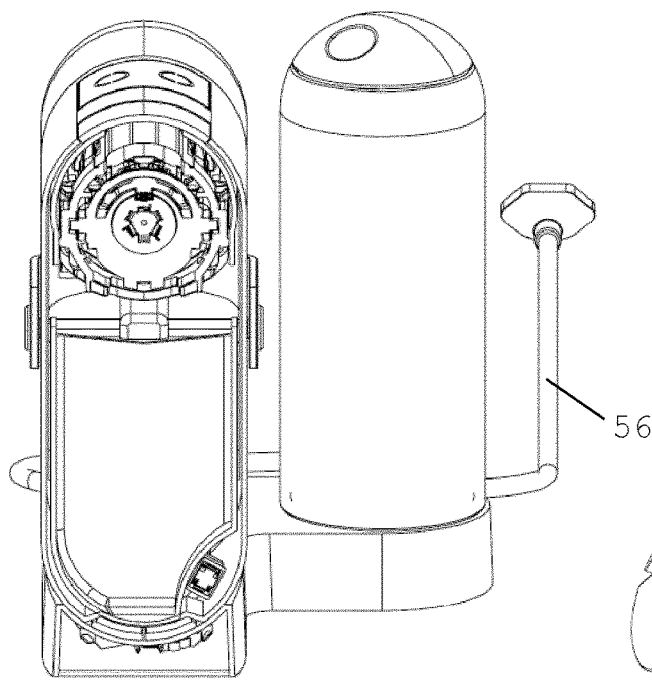
FIG. 11 is a cross-sectional front view of the machine of FIG. 2 with the module's deployable placement members retracted so that the module fits on a docking station of the machine.
Figure 10:
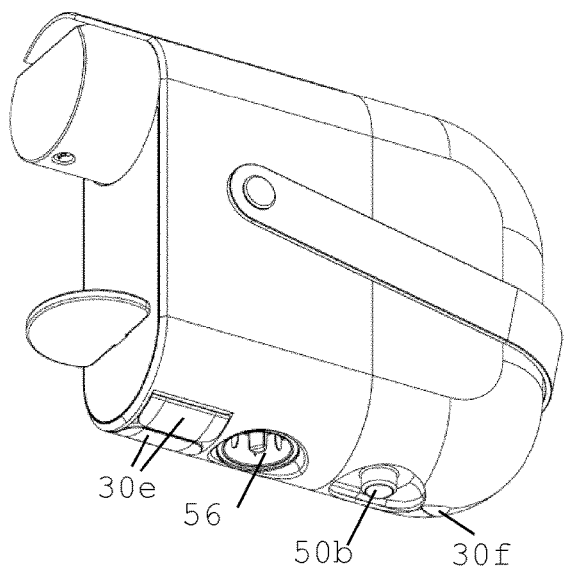
FIG. 10 is a perspective view of the module of FIG. 9 with its deployable placement members retracted.
Figure 12:
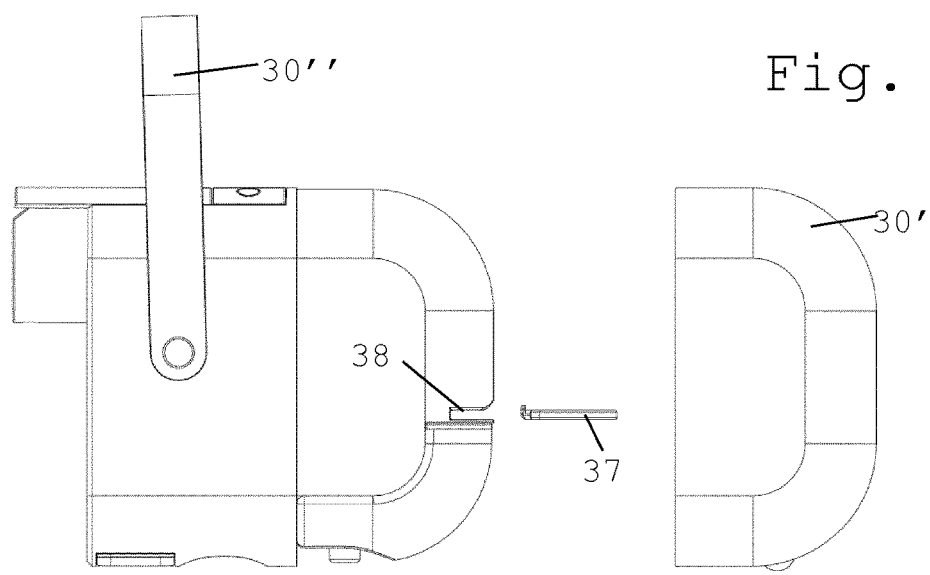
FIG. 12 is a side view of the module of the machine shown in any of FIGS. 1 to 11 in a configuration for storing a recipient support of the machine.
Figure 13:
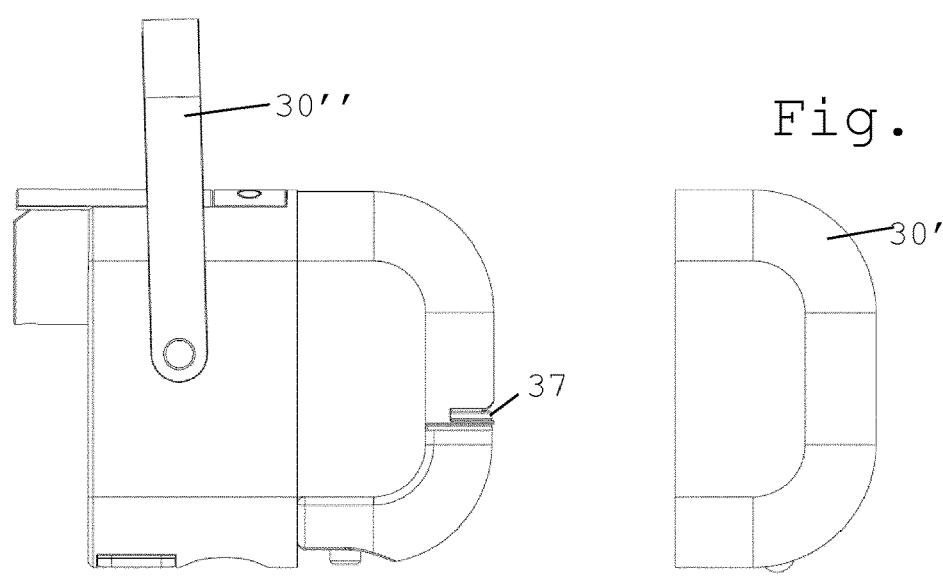
FIG. 13 is a side view of the module of the machine shown in FIG. 12 having an uncovered compartment in which the recipient support is stored.
Figure 14:
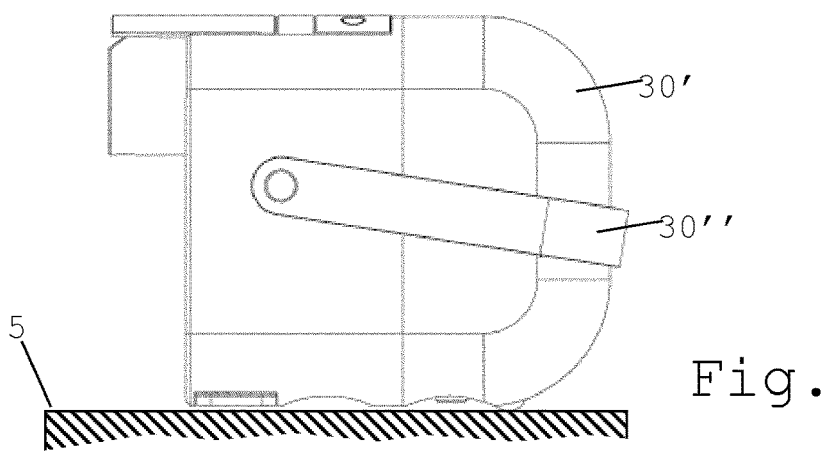
FIG. 14 is a side view of the module of the machine shown in FIGS. 12 and 13 upon covering the compartment of the recipient support with a cover.

FIGS. 1 to 14 illustrate two exemplary embodiments (with minor design differences) of a beverage machine 1 in accordance with the invention. The differences are illustrated in FIGS. 1 and 2 and relate specifically to the arrangement in machine 1 of the liquid supply arrangement 50a.

Machine 1 can be configured for preparing and dispensing a beverage, such as tea, coffee, hot chocolate, cold chocolate, milk, soup or baby food.

Machine 1 includes a beverage preparation and dispensing unit that has:
   an ingredient container 46,50,50a, such as a container 50,50a for supplying a beverage ingredient (e.g. water) and/or a container 46 for collecting waste ingredient;
   a dispensing head 35 comprising a beverage outlet 36 for dispensing the beverage to a beverage dispensing surface 5,37 arranged for supporting a user-mug or a user-cup 4;
   a liquid circuit for processing said beverage and delivering such beverage into outlet 36, the liquid circuit comprising at least one activatable unit 40,51,52 that is passed through by liquid during beverage preparation, such as an activatable unit selected from:
      a liquid driver 51 such as an electric pump e.g. a solenoid pump, a rotary pump, a diaphragm pump, a positive displacement pump or a peristaltic pump, for driving liquid to outlet 36;
      a thermal conditioner 52, such as a liquid heater and/or cooler, for thermally conditioning liquid delivered by outlet 36; and
      an ingredient processing unit 40, such as a unit 40 mounted in or comprised in of fixed to the dispensing head 35.

The liquid circuit may include one or more liquid ducts 53 for guiding liquid from a liquid supply arrangement 50,50a, 50b to outlet 36.

The beverage preparation and dispensing unit further includes:
   a power unit 54' connected to a main switch 54 and to the at least one activatable unit 40,51,52, the supply of power from power unit 54' to the at least one activatable unit 40,51,52 being interrupted by actuating main switch 54, optionally power unit 54' being connected to a control unit 55 with a user-interface device 31; and
   a functional part that is configured to perform a function other than actuating main switch 54 and that has a beverage preparing and dispensing position and that is movable into a different position in which no beverage is prepared or dispensed, such as a functional part selected from ingredient container 46,50,50a, dispensing head 35, one of activatable unit(s) 40,51,52 or a carrying handle 30".

Functional part 40,35 is further configured to operate, when moved to the dispensing position or to the different position, main switch 54 so as to enable or disable the supply of power from the power unit 54' to the at least one activatable unit 40,51,52.

Machine 1 may further comprise an outside housing 30 having one or more outside faces 30a,30b,30c,30d. Such faces may be selected from a top face 30a, a side face 30b, a rear face 30c and a front face 30d. Functional part 40,35 can be movable outwards out of outside housing into a deployed operative position and inwards into outside housing 30 into a retracted storage position. Functional part 40,35 may be or comprise dispensing head 35 so that in the deployed operative position a beverage is dispensible via outlet 36 to beverage dispensing surface 5,37.

In the retracted storage position, outlet 36 can be confined within outside housing 30 and/or dispensing head 35 can be surrounded by outside faces of outside housing that are generally flush with apparent faces of the dispensing head 35.

Dispensing head 35 may be guided from its deployed operative position into its retracted storage position and vice versa by a cam-follower 31a,31c and cam 31b,31d arrangement.

Dispensing head 35 can be configured so that it can be maintained in:
- the deployed operative position whether activatable unit(s) 40,51,52 is/are activated or maintained activated or deactivated or maintained deactivated; and/or
- the retracted storage position whether activatable unit(s) 40,51,52 is/are activated or maintained activated or deactivated or maintained deactivated.

Dispensing head 35 may be configured so that it can be movable:
- manually by a user from the deployed operative position to the retracted storage position and/or vice versa; and/or
- automatically, e.g. by a motor and/or an automatic return-spring, from the deployed operative position to the retracted storage position and vice versa, optionally dispensing head 35 being moved into its deployed operative position when machine 1 is powered and/or is moved into its retracted storage position when a powering of machine 1 is interrupted.

Dispensing head 35 can be configured so that it can be maintained in its deployed operative position and/or in its retracted storage position by at least one of: a friction and/or magnetic force, clipping arrangement and locking arrangement 30',35'.

The functional part can be or comprise (a) user-interface device 31 movable from:
- the deployed operative position that is adjacent to an outside face 30a of one or more of outside faces 30a,30b,30c of outside housing 30 so that device 31 is accessible by a user for controlling the beverage preparation and dispensing unit to prepare and dispense beverage; to
- the retracted storage position in the outside housing so that device 31 is inaccessible to a user for operating such machine 1;
- and/or vice versa.

User-interface device 31 may be guided from its deployed operative position into its retracted storage position and vice versa by a cam-follower 31a,31c and cam 31b,31d arrangement. Cam 31b,31d can have a first section extending along first direction 31' and a second section extending along second direction 31". User-interface device 31 may be associated with a pair of cams 31b,31d having different, sequentially off-set, profiles such that when user-interface device 31 is moved from the operative to the storage positions it has a front edge 33' that is lowered and displaced underneath outside housing 30 while a rear edge 33" of device 31, uncovered by outside housing 30, remains above front edge 33" during a part of a movement of user-interface device 31 between the operative and the storage positions.

User-interface device 31 may bear one or more interface elements, e.g. touch elements, such as button(s) 32 or a touch pad or a touch screen, and/or one or more user indicators, such as light means e.g. LED or signal screen, which interface element(s) relate to operations of a machine's control unit 55 other than activities of power unit 54'.

User-interface device 31 can have in its deployed operative position a main outside face 33 that is generally flush with housing outside face 30a that is adjacent to the user-interface device 31. For example, device's main outside face 33 in the deployed operative position is predominantly surrounded, e.g. entirely surrounded, by housing outside faces 30a that are flush with main outside face 33.

User-interface device 31 may be coupled to dispensing head 35 so as to be driven by head 35 or vice versa between the deployed operative and the retracted storage positions. For example, dispensing head 35 and user-interface device 31 are coupled together by a rigid or an articulated arrangement, such as a cam-follower 31c and cam 35a arrangement or a flexible mechanically connector or by a lever arrangement.

User-interface device 31 can be movable, e.g. manually and/or automatically, from its deployed operative position into its retracted storage position and vice versa along a first direction 31' and a second direction 31" that is non-parallel to first direction 31'.

First direction 31' may follow a movement of the user-interface device 31 generally sinking into and emerging from outside housing 30, optionally first direction 31' being generally orthogonal to housing outside face 30a that is adjacent to device 31 in its operative position or at an angle to said outside face 30a that is in the range of 45 to 90 deg., such as 60 to 90 deg., e.g. 75 to 90 deg. Second direction 31" can follow a movement of device 31 hiding behind and along housing outside face 30a that is adjacent to user-interface device 31 in its deployed operative position, optionally second direction 31" being generally parallel to outside face 30a that is adjacent to device 31 in its operative position or at an angle to said outside face that is in the range of 0 to 45 deg., such as 0 to 30 deg., e.g. 0 to 15 deg.

First direction 31' may be at a large angle relative to a main outside face 33 of user-interface device 31 in its deployed operative position, for instance a large angle in the range of 45 to 90 deg., such as a large angle of at least 60 deg., e.g. a large angle of at least or 75 or 85 deg. Second direction 31" can be at a small angle relative to a main outside face 33 of user-interface device 31 in its deployed operative position, for instance a small angle in the range of 0 to 45 deg., such as a small angle of less than 30 deg., e.g. a small angle of at less than 15 or 5 deg.

Power unit 54' can have a connector 56 to an external power supply, such as an electric cord and/or plug connectable to the mains, and an internal power accumulator 57, such as a rechargeable battery, for powering to prepare and dispense said beverage when such machine 1 is not powered via connector 56. For example, accumulator 57 is charged via connector 56 when connected to an external power supply.

Machine 1 may include a docking station 2 and a module 3 disconnectably connected to docking station 2. Docking station 2 and module 3 may have at least one of:
- a station ingredient supply 50a such as a water tank and a module liquid connector 50b connectable to station ingredient supply 50a; and
- a station connector 56 to an external power supply, such as a station electric cord and/or plug connectable to the mains, and a module connector 58, e.g. a rigid connector stationary in module 3, connectable to station connector 56, e.g. a rigid connector stationary in the station 2.

Module 3 may incorporate an arrangement for preparing and dispensing the beverage.

Module 3 can include the beverage preparation and dispensing unit and a main reservoir 50 fluidically disconnectably connectable by a liquid connector 50*b* to docking station 2, e.g. to a main reservoir 50 and/or to a liquid supply line of docking station 2.

Module 3 may include at least one of: internal power supply 57, such as a rechargeable battery; connector to an external power supply 56, such as a module electric cord and/or plug connectable to the mains; control unit for controlling module 3 and optionally functions contained in the docking station; and interface device 31 that is optionally connected, when present, to control unit 55.

Machine 1 may incorporate one or more movable placement members 30*e* for placing such machine 1, e.g. a module 3 thereof, onto a generally flat external support surface 5 in an orientation for preparing said beverage in the liquid circuit and delivering such beverage via the beverage outlet 36 to beverage dispensing surface 5,37.

Movable placement member(s) 30*e* can have a deployed placement position for increasing a stability and/or safely placing such machine 1, e.g. a module 3 thereof, on external support surface 5 in an orientation for preparing and dispensing said beverage. For instance, placement member(s) 30*e* in the deployed placement position extends away from outside housing 30 and/or extends laterally beyond at least one of side face 30*b*, rear face 30*c* and front face 30*d*. Movable placement member(s) 30*e* may have a retracted rest position within outside housing 30 or collapsed against outside housing 30, e.g. collapsed against and extending along outside housing 30, for: reducing a size of such machine 1, e.g. of a module 3 thereof, to displace it; and/or providing a configuration suitable for placing module 3 onto docking station 2 of such machine 1 and connecting module 3 to docking station 2.

Placement member(s) 30*e* can be pivotably and/or translationally mounted relative to outside housing 30, for moving the placement member(s) from the deployed placement position to the retracted rest position and vice versa.

In the orientation for preparing the beverage in the liquid circuit and delivering such beverage via beverage outlet 36 to beverage dispensing surface 5,37:

the or at least one placement member 30*e* in the deployed placement position may extend laterally beyond a housing outside face 30*b*;30*c*,30*d* that extends upright above said placement member 30*e* such as beyond such housing outside face 30*b*;30*c*,30*d* by a horizontal distance of at least 3 mm such as in the range of 5 to 25 mm, e.g. 10 to 15 mm; and/or such machine 1 can have:

an overall height extending from a bottom end 30' of deployed placement member 30*e* to a top end of machine 1; and an overall distance spacing a housing outside face 30*b*;30*c* extending upright above placement member 30*e* and a housing outside face 30*b*;30*d* facing the former housing outside face 30*b*;30*c*, such that a ratio of the overall height/overall distance is of at least 1.3, such as at least 1.5, for instance at least 2, for example at 2.5, e.g. at least 3; and/or outside housing 30 can have a bottom outside face 30*a*' adjacent to the or at least one placement member 30*e*, bottom outside face 30*a*' having a generally convex, biconvex, multi-convex or downwardly tapered shape, such as a generally rounded shape, e.g. cylindrical, spherical, ellipsoidal, ovoidal or conical shape, and/or such as generally polyhedral shape, e.g. prismatic or pyramidal shape.

Machine 1 can have one or more stationary placement members 30*f* for placing such machine 1, such as a module of such machine 1, onto a generally flat external support surface 5. For instance, machine 1 has a stationary placement member 30*f* protruding upright underneath machine 1 in an orientation for preparing and dispensing said beverage.

Ingredient processing unit 40 can have an ingredient holder forming an ingredient seat 45, e.g. a seat in which ingredients are mixed in a mixing unit. Optionally, ingredient processing unit 40 has a first module 41 and a second module 42 that are movable relatively to each other by an actuator between: a distant configuration for inserting into seat 45 and/or removing from seat 45, e.g. towards a waste ingredient collector 46, an ingredient, e.g. a flavouring ingredient supplied within a capsule 6 into seat 45 for instance via an ingredient supply channel 47; and a proximate configuration for processing the ingredient in seat 45.

Such actuator may include at least one of: an automatic actuator, e.g. a motor such as an electric motor; a semi-automatic actuator, e.g. a return-spring arrangement for automatically returning the first and second modules either into their distant configuration or into their proximate configuration; and a user-handle 43, such as a handle 43 that is connected to at least one of first and second modules 41,42 and that actuates at least one of modules 41,42 by moving handle 43 from a first position to a second position. For instance, such handle in at least one of its first and second positions being flush with at least one of (an) outside housing 30 and (a) user-interface device 31.

The actuator can be connected to at least one of the first and second modules by a transmission that comprises at least one of a belt transmission, a gear transmission, e.g. a toothed gear transmission, and a lever transmission 431,432, 433,434.

Dispensing surface 5,37 can be formed by an external placement support 5 for placing such machine 1 in position for preparing and dispensing said beverage.

Dispensing surface 5,37 may be formed by a user-recipient support device 37 of such machine 1. For instance, user-recipient support device 37 is removable from under outlet 36, such as separable from a module 3 of such machine 1 and storable in a storage seat 38 of such module 3, e.g. storable in storage seat 38 and secured therein by at least one of: friction and/or magnetic force between seat 38 and support device 37; clipping or locking support device 37 in seat 38; and covering seat 38 by at least one of a door, gate, housing cover 30' e.g. a cocoon-type half shell, carrying handle 30" and belt 30".

The invention claimed is:

1. A machine for preparing and dispensing a beverage comprising:

a beverage preparation and dispensing unit that has:

an ingredient container;

a dispensing head comprising a beverage outlet for dispensing the beverage to a beverage dispensing surface arranged for supporting a user-mug or a user-cup; and a liquid circuit for processing the beverage and delivering such beverage into the beverage outlet, the liquid circuit comprising at least one activatable unit that is passed through by liquid during beverage preparation;

a power unit connected to a main switch and to the at least one activatable unit, the supply of power from the power unit to the at least one activatable unit being interrupted by actuating the main switch;

a functional part that is configured to perform a function other than actuating the main switch and that has a beverage preparing and dispensing position and that is movable into a different position in which no beverage is intended to be prepared or dispensed; and the functional part is further configured to operate, when moved to the dispensing position or to the different position, the main switch so as to enable or disable the supply of power from the power unit to the at least one activatable unit.

2. The machine of claim 1, comprising an outside housing having one or more outside faces, and wherein the functional part is movable outwards out of the outside housing into a deployed operative position and inwards into the outside housing into a retracted storage position.

3. The machine of claim 2, wherein the functional part comprises the dispensing head and wherein in the deployed operative position a beverage is dispensible via the outlet to the beverage dispensing surface.

4. The machine of claim 3, wherein the dispensing head is configured so that it can be:
   maintained in:
      the deployed operative position whether the activatable unit(s) is activated or maintained activated or deactivated or maintained deactivated; and/or
      the retracted storage position whether the activatable unit(s) is activated or maintained activated or deactivated or maintained deactivated;
   and/or
   movable:
      manually by a user from the deployed operative position to the retracted storage position; and/or
      automatically, from the deployed operative position to the retracted storage position and vice versa.

5. The machine of claim 2, wherein the functional part comprises a user-interface device movable from:
   the deployed operative position that is adjacent to an outside face of the one or more outside faces of the outside housing so that the device is accessible by a user for controlling the beverage preparation and dispensing unit to prepare and dispense said beverage; and
   to the retracted storage position in the outside housing so that the device is inaccessible to a user for operating such machine.

6. The machine of claim 5, wherein the user-interface device:
   bears one or more interface elements relating to operations of a control unit of the machine other than activities of the power unit; and/or
   has in its deployed operative position a main outside face that is flush with the housing outside face that is adjacent to the user-interface device.

7. The machine of claim 5, wherein the user-interface device is movable from its deployed operative position into its retracted storage position and vice versa along a first direction and a second direction that is non-parallel to the first direction.

8. The machine of claim 1, wherein the power unit has a connector to an external power supply, and an internal power accumulator, for powering to prepare and dispense the beverage when such machine is not powered via the connector.

9. The machine of claim 1, comprising a docking station and a module disconnectably connected to the docking station, the docking station and the module comprising at least one element selected from the group consisting of:
   a station ingredient supply and a module liquid connector connectable to the station ingredient supply; and
   a station connector to an external power supply,
   the module comprising an arrangement for preparing and dispensing the beverage.

10. The machine of claim 9, wherein the station ingredient supply is a water tank.

11. The machine of claim 1 comprising one or more movable placement members for placing the machine onto a flat external support surface in an orientation for preparing the beverage in the liquid circuit and delivering such beverage via the beverage outlet to the beverage dispensing surface, the movable placement member(s) having:
   a deployed placement position for increasing a stability and/or safely placing the machine on the external support surface in an orientation for preparing and dispensing the beverage; and
   a retracted rest position within the outside housing or collapsed against the outside housing for:
   reducing a size of such machine; and/or
   providing a configuration suitable for placing the module onto a docking station of the machine and connecting the module to the docking station.

12. The machine of claim 11, wherein in the orientation:
   the placement member in the deployed placement position extends laterally beyond a housing outside face that extends upright above the placement member;
   the machine comprising:
   an overall height extending from a bottom end of the deployed placement member to a top end of the machine; and
   an overall distance spacing the housing outside face extending upright above the placement member and the facing housing outside face,
   such that a ratio of the overall height/overall distance is of at least 1.3.

13. The machine of claim 1, wherein the machine has a stationary placement member for placing the machine onto a flat external support surface.

14. The machine of claim 1, wherein the ingredient processing unit has an ingredient holder forming an ingredient seat.

15. The machine of claim 1, wherein the dispensing surface is formed by:
   an external placement support for placing such machine in position for preparing and dispensing said beverage; and
   a user-recipient support device of the machine.

* * * * *